M. BRADLEY.
Revolving Horse Rake.
No. 25,088. Patented Aug. 16, 1859.
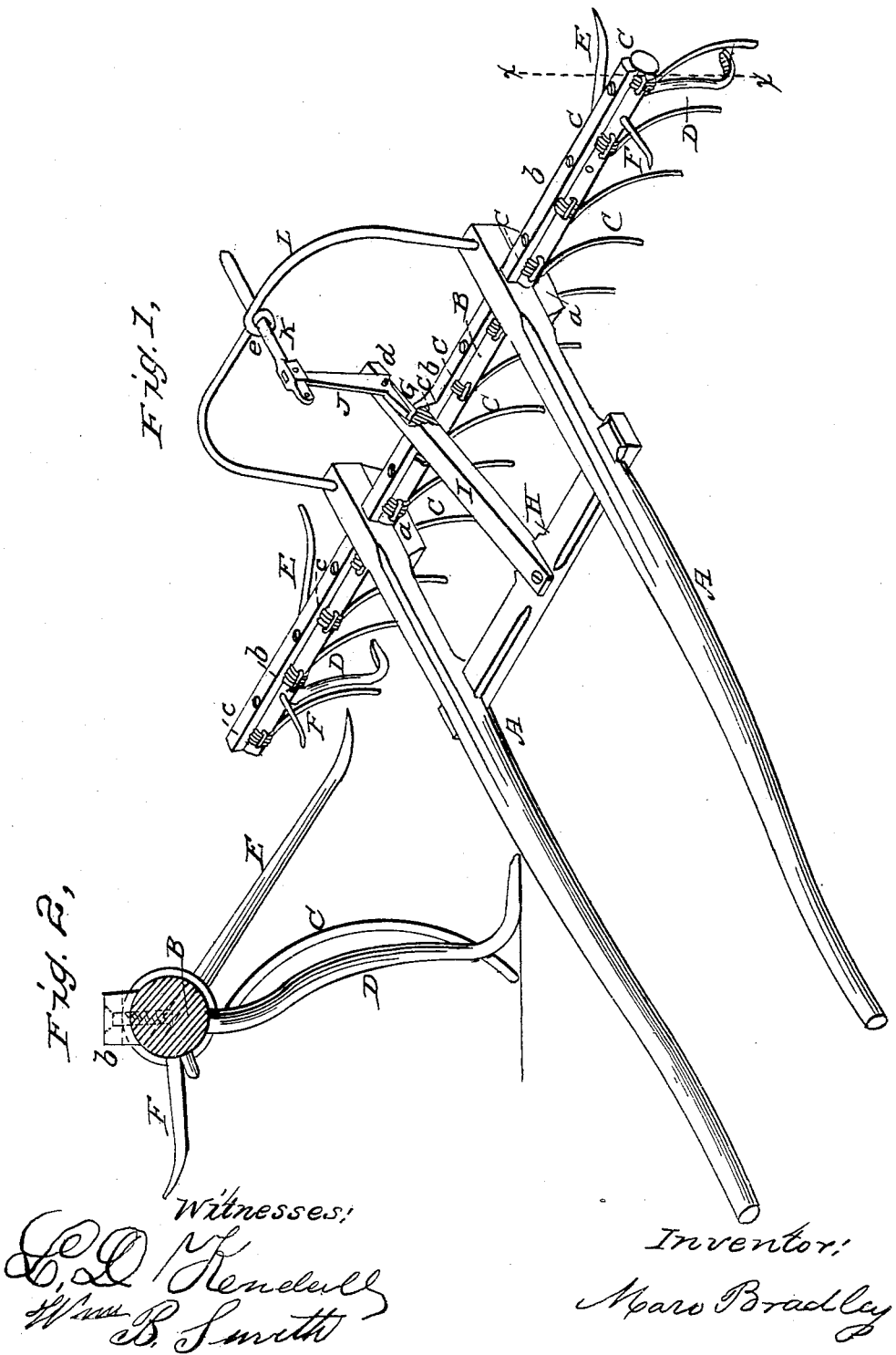
Witnesses:
Inventor:
Marc Bradley

UNITED STATES PATENT OFFICE.

MARO BRADLEY, OF DUNDEE, ILLINOIS.

IMPROVEMENT IN HORSE-RAKES.

Specification forming part of Letters Patent No. 25,088, dated August 16, 1859.

*To all whom it may concern:*

Be it known that I, M. BRADLEY, of Dundee, in the county of Kane and State of Illinois, have invented a new and Improved Horse-Rake; and I do hereby declare that the following is a full, clear, and exact description of the same, reference being had to the annexed drawings, making a part of this specification, in which—

Figure 1 is a perspective view of my invention. Fig. 2 is a transverse section of the same, taken in the line $x$ $x$ of Fig. 1.

Similar letters of reference indicate corresponding parts in the two figures.

To enable those skilled in the art to fully understand and construct my invention, I will proceed to describe it.

A A represent the thills of the rake, which may be of usual construction; and B is the rake-head, which is of cylindrical form and fitted in a suitable bearing, $a$, at the back part of the thills A.

C represents the rake-teeth, which are constructed of wire coiled around the head B, and having their ends secured in metal bars $b$, which are bolted or screwed longitudinally to the rake-head, and having recesses $c$ formed in their inner sides to receive the coils of the teeth, as shown plainly in Fig. 1. There are three bars $b$, one being secured to the rake-head between the thills A A, the other two being secured to the head at each side of the thills. The bars $b$, besides securing the teeth to the head B, also prevent any longitudinal play of the same, in consequence of their ends abutting against the sides of the thills directly over the bearings $a$ of the head, as shown clearly in Fig. 1.

To the rake-head B there are attached two curved rods, D D. The lower ends of these rods are bent so as to be in a nearly horizontal position, and when the rake-teeth are at work the lower ends of the rods D rest on the ground, the lower ends of the teeth C being slightly above the surface of the ground. (See Fig. 2.) To the rake-head there are also attached two spurs, E E, which are rather shorter than the rods D D. The spurs E project downward and outward from the back part of the head B, and they are slightly curved upward at their ends, as shown clearly in Fig. 2. To the front side of the head B two spurs, F F, are attached. These spurs also project down ward and outward from the rake-head, and they are considerably shorter than the spurs E, and like them have their ends curved slightly upward. The rods D and spurs E F are attached to the rake-head near each end, as shown plainly in Fig. 1.

On the central bar, $b$, at a point equidistant between the two thills A A, there is a projection, G, and to the cross-bar H of the thills A A an elastic bar, I, is attached, said bar having a shoulder, $c$, at its outer end, against which shoulder the projection G bears when the rake is at work. (See Fig. 1.) In the outer part of the bar I a bent lever, J, is placed or secured by a fulcrum-pin, $d$. The lower part of this lever J extends as far as the shoulder $c$ of the bar I, and the upper end of said lever is pivoted to a slide-rod, K, which is fitted in a guide, $e$, formed in a bow-shaped rod, L, which is attached to the back part of the thills.

The operation is as follows: As the implement is drawn along the teeth C gather the hay, the rake-head being kept in proper working position in consequence of the projection G bearing against the shoulder $c$. The rods D support the rake and keep the ends of the teeth free from the ground, and the device consequently may be easily drawn along and the hay gathered in the hollow of the teeth C. When the rake-teeth are full the operator or attendant shoves forward the slide-rod K, and the lower part of the bent lever J, in consequence of bearing on the upper end of the projection G, will elevate the back part of the bar I and free the projection G from the shoulder $c$. The rake then turns a certain distance, owing to the resistance of the hay in the hollow of the rake and the forward movement of the machine, and as such resistance ceases the short spurs F come in contact with the ground, and, in connection with the spurs E and rods D, rotate the rake completely around to its proper working position, the projection G striking the lower part of lever J, and, in consequence of the resistance offered to it, coming gently in contact with the shoulder $c$ of the bar I. In consequence of having the spurs F comparatively short, the rake is turned within a short compass and with an increased speed after the hay is freed from it. The windows therefore are quite compact, not of the wide scattered form as produced when half wheels or spurs of equal length are attached to the rake-head, and the hay by my invention may be readily put up in cocks. The teeth C, in consequence of being secured to the rake-head by the bars b, are firmly secured to the head and prevented from being injured by the rotation of the rake, the coils not being allowed to come in contact with the ground.

I claim as new and desire to secure by Letters Patent—

In the construction of horse-rakes, the use of the recessed metal bar b, spurs E F, rods or shoes D, elastic bar I, lever J, slide-rod K, and projection G, the whole being constructed and employed together in the manner and for the purpose substantially as herein described.

MARO BRADLEY.

Witnesses:
P. D. KENDALL,
WM. B. SMITH.